A. L. ARCH.
INDICATOR FOR VEHICLES.
APPLICATION FILED AUG. 23, 1915.
1,215,097. Patented Feb. 6, 1917.
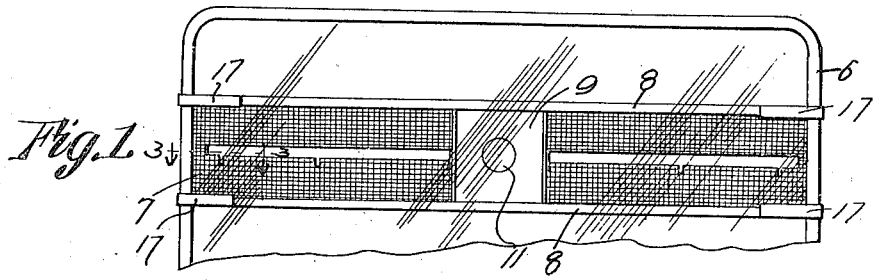
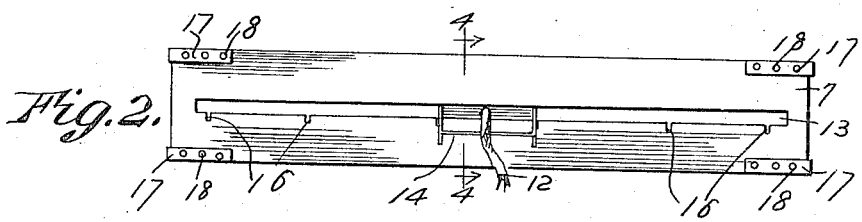
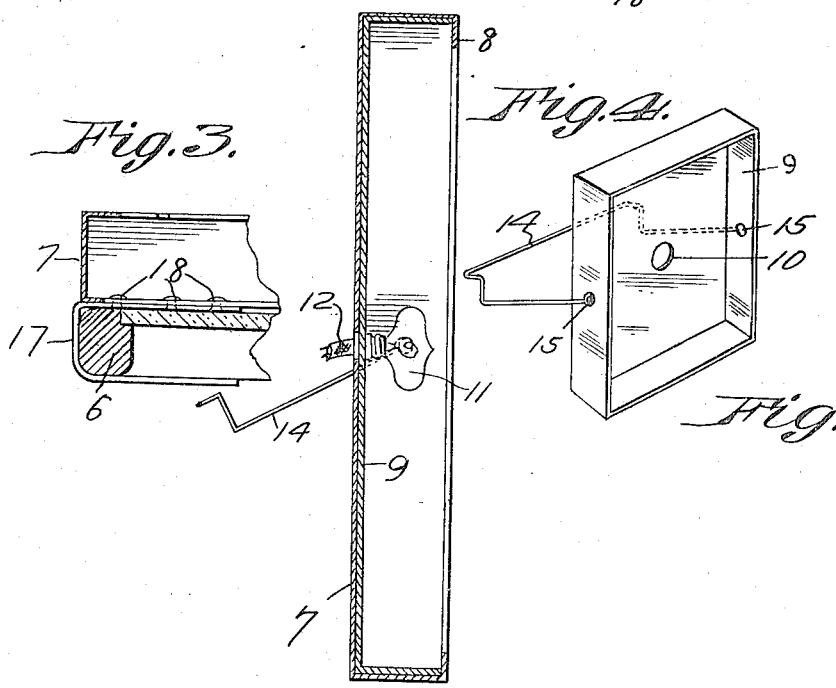
Witnesses:
M. I. Pfeifer
J. R. Pattison
Inventor
Abraham L. Arch
By Frank S. Appleman
Attorney

UNITED STATES PATENT OFFICE.

ABRAHAM L. ARCH, OF HARRISBURG, PENNSYLVANIA.

INDICATOR FOR VEHICLES.

1,215,097.  Specification of Letters Patent.  Patented Feb. 6, 1917.

Application filed August 23, 1915. Serial No. 46,852.

*To all whom it may concern:*

Be it known that I, ABRAHAM L. ARCH, a citizen of the United States of America, and resident of Harrisburg, in the county of Dauphin, and State of Pennsylvania, have invented certain new and useful Improvements in Indicators for Vehicles, of which the following is a specification.

This invention relates to indicators for vehicles and particularly to novel means for showing a course of direction of travel which a vehicle is going to follow as for instance whether the said vehicle is to turn to the right or left or to maintain a straight course of travel.

A further object of this invention is to provide an indicator which may be applied to a wind shield of an automobile or to some other part thereof, the said invention being shown herein as having means for attachment to a wind shield, and including means for adjustably holding an indicator, said indicator having convenient means for its manipulation.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a fragment of a wind shield with the invention, in elevation, applied thereto;

Fig. 2 illustrates a rear view in elevation of the indicator;

Fig. 3 illustrates a fragmentary sectional view on the line 3—3 of Fig. 1;

Fig. 4 illustrates a sectional view on the line 4—4 of Fig. 2; and

Fig. 5 illustrates a perspective view of the indicator.

In these drawings 6 denotes a wind shield and 7 a casing comprising a back, upper and lower walls, and end walls, the said walls having a front flange 8, which front flange and the rear wall or back constitute a guide in which the indicator 9 may slide.

The indicator is preferably of reflective material and it has an aperture 10 for the insertion of a light fixture, such as an electric lamp 11, the said lamp 11 having a conductor 12 which extends through a slot 13 in the back 7 of the casing, the said slot furthermore forming a way in which the indicator securing means may slide, the said securing means comprising, in the present embodiment of the invention, a wire 14 having its ends mounted on pivots 15 extending from the side of the indicator and the said wire being formed in a convenient configuration that it may be manipulated for the purpose of moving the indicator longitudinally of the casing. There is a series of notches 16 extending downwardly in the back of the casing, the said notches merging with the slot 13 and they are intended to receive portions of the wire 14 so that the indicator may be held at different positions of adjustment.

From an inspection of the drawing, it will be apparent that an operator may manipulate the wire 14 to raise it out of the notches at either end or intermediately the length of the casing according to its position and that the said indicator may be moved to denote the intended direction of travel and when the wire is released, it will fall into the notches and the indicator will be retained in that position until the wire is again manipulated.

The device is of comparatively inexpensive construction and is of such strength and durability as to withstand wear due to its use.

As a means for securing the casing to the wind shield of an automobile, there are clips 17 which are secured to the back of the casing by fastenings such as the rivets 18, the said clips being at the rear corners of the casing and being extended around the ends of the frame of the wind shield so as to frictionally engage the said ends of the frame for the purpose of retaining the indicator casing at proper height, it being understood that the height may be regulated to suit particular requirements by moving the casing vertically on the said frame.

I claim—

1. In an indicator for vehicles, a casing having a slot in its back wall, and vertically disposed notches extending downwardly from the slot, an indicator slidable in the casing and visible from the front thereof, an indicator securing means including a member hinged to the indicator and adapted to enter the notches for holding the said indicator at different positions of adjustment, and means for securing the said casing to a wind shield.

2. In an indicator, a casing having a slotted back wall with notches therein and a guiding flange at the front, an indicator slidable in the casing and held therein by the flange, an indicator retaining device comprising a length of material having its ends pivotally connected to the indicator, said retaining device extending through the slot in the casing and adapted to enter the notches of the back wall for retaining the indicator at different positions of adjustment.

In testimony whereof, I hereunto affix my signature in the presence of two witnesses.

ABRAHAM L. ARCH.

Witnesses:
 LOUIS W. KAY,
 M. ELIZABETH WALSH.

Copies of this patent may be obtained for five cents each, by addressing the "Commissioner of Patents, Washington, D. C."